US006184786B1

United States Patent
Medeiros

(10) Patent No.: US 6,184,786 B1
(45) Date of Patent: Feb. 6, 2001

(54) EMERGENCY VEHICLE DOOR HAZARD LIGHTS

(76) Inventor: Wayne Medeiros, P.O. Box 364, Taunton, MA (US) 02780

(*) Notice: Under 35 U.S.C. 154(b), the term of this patent shall be extended for 0 days.

(21) Appl. No.: 09/332,375

(22) Filed: Jun. 14, 1999

(51) Int. Cl.[7] ................................................. B60Q 1/22
(52) U.S. Cl. ........................ 340/463; 340/470; 340/471; 340/472; 340/473; 340/468; 340/469
(58) Field of Search .................................. 340/471, 472, 340/468, 425.5, 469, 473, 470, 384.4, 463

(56) References Cited

U.S. PATENT DOCUMENTS

| | | |
|---|---|---|
| 1,248,930 | 12/1917 | Schultz . |
| 2,844,810 | 7/1958 | Steele . |
| 2,855,502 | 10/1958 | Johnson . |
| 2,901,593 | 8/1959 | McNally . |
| 2,918,565 | 12/1959 | Vermette . |
| 4,912,454 | 3/1990 | Solow . |
| 4,972,173 | 11/1990 | Raciti . |
| 5,193,895 | 3/1993 | Naruke . |
| 5,523,926 | 6/1996 | Gold . |
| 5,711,593 | 1/1998 | Gold . |
| 5,842,770 | * 12/1998 | Gold ...................................... 340/471 |
| 5,852,400 | * 12/1998 | Gold ...................................... 340/471 |

* cited by examiner

*Primary Examiner*—Daniel J. Wu
*Assistant Examiner*—Hung Nguyen
(74) *Attorney, Agent, or Firm*—Thomas E. Workman, Jr.

(57) ABSTRACT

An unacceptable number of police, fire, ambulance and other emergency personnel are killed or injured when they pull over to the side of the road and exit their vehicle. These accidents occur when passing vehicles are not aware that an occupant is exiting the vehicle, and these passing vehicles travel too close to the stopped emergency vehicle.

Inventions that automatically illuminate an open door call attention to emergency personnel responding to hostile situations involving gunfire, placing emergency personnel at risk. Safety features need to be easily disabled in order to protect the occupants as they exit an emergency vehicle in such hostile situations.

This invention places blinking hazard lights in the doors of an emergency vehicle so that when any door is opened, the exposed rear facing surface of the door contains a hazard light that is selectively activated in order to blink in concert with the emergency lights on top of the emergency vehicle. When the overhead emergency lights are not activated, but the headlights are on, the door hazard light is illuminated without any blinking. The door hazard lights are disabled when the "kill" switch for the dome light in the vehicle is set to disable the dome light.

3 Claims, 3 Drawing Sheets

EMERGENCY VEHICLE DOOR HAZARD LIGHTS

BACKGROUND OF THE INVENTION

1. Field of the Invention

The invention is a safety device which protects the occupant or passenger of an emergency vehicle as they alight from that vehicle. Drivers and passengers of emergency vehicles are often called upon to respond to situations which require their immediate attention. In responding to the demands of their job, these individuals often exit their vehicle after parking it on the shoulder of a road. Safety devices have been introduced which draw attention to an opening door. These devices are seldom seen on emergency vehicles which must respond to hostile situations, because the very devices intended to protect the police officers or other responding individuals call attention to their presence, often endangering those individuals and subjecting them to harm from a hostile perpetrator.

This invention provides automatic protection when the responding emergency personnel want to be seen, and protects them from inadvertent disclosure when they do not wish to be seen.

2. Description of Prior Art

Previous inventions have solved the problem of how to turn on a warning light on the side face of a vehicle's door, when that door is opened. Some inventions have taught how such an indicator light might blink on and off, mimicking the turn signal of the vehicle.

U.S. Pat. No. 2,844,810 disclosed an invention which would call attention to an open door by selectively illuminating one of two indicator bulbs mounted in a housing in the vehicle door. The invention also disclosed a reflective strip, mounted on the side face of the door, which would reflect any illumination and call attention to the open door. The invention operated on a switch which automatically opened whenever the vehicle door was opened, in the same manner that dome lights are illuminated in modern vehicles today.

U.S. Pat. No. 4,972,173 disclosed an invention intended to illuminate the zone between the vehicle and the open door, while calling attention to the open door. This illumination was intended to assist the occupant as they exited the vehicle, while having a second purpose of always drawing attention to the open door.

U.S. Pat. No. 5,193,895 disclosed an invention which is activated when a vehicle door is opened, and which features a low profile strip of light emitting diodes as the source of illumination. Like the inventions that came before it, this invention is automatically activated by a switch that is activated when the door is opened.

The prior art solves the problem of automatically illuminating a hazard light when a door is opened, but does not address the selection of how the illumination pattern will take on a meaningful pattern, depending on the emergency apparatus that is or is not enabled on the vehicle, nor does it solve the problem of selectively disabling the illumination when such illumination would place the occupant of the emergency vehicle in personal jeopardy. This invention solves these problems, and offers both safety and protection to the occupants of vehicles so equipped.

SUMMARY OF THE INVENTION

This invention provides a safety hazard light, located in that portion of the door that is only visible when the door is opened. The hazard light operates to provide a bright strobe effect whenever the overhead emergency lights are being operated. The hazard light operates in steady fashion when the overhead emergency lights are not operating. The hazard light is disabled, and will not operate, whenever the vehicle is operating in a "silent" mode, such mode disabling the operation of the dome light in the vehicle, as well as any other indicators that would draw attention to the presence of the vehicle.

DESCRIPTION OF THE PREFERRED EMBODIMENT

Referring to FIG. 1, the invention is shown from a top view of an emergency vehicle 1 equipped with emergency lights 2 on the roof of said vehicle. In this operating mode, the illumination devices 3 in the shell of the door 4 blink on and off at a frequency that approximates that of the rotating emergency lights that are activated on the roof of the vehicle.

Referring to FIG. 2, the invention is shown from a top view of an emergency vehicle 1 equipped with emergency lights 2 on the roof of said vehicle. In this operating mode, the illumination devices 3 in the shell of the door 4 illuminate in a steady fashion when the headlights 5 are activated, and when the dome lights in the vehicle are not disabled.

Referring to FIG. 3, the invention is shown in a perspective view, with the illumination devices 3 shown in the shell of the door 4.

Referring to FIG. 4, the circuit is shown with an electrical ground 6 attached to a switch 7 that is electrically open whenever the vehicle door 4 is closed, and which is electrically closed when the vehicle door 4 is opened as in the figure. A double pole electrical switch 8 enables the left 9 and right 10 headlights in the vehicle, when in the on position as shown. The other pole of the double pole electrical switch 8 is connected to the illumination device 11 contained in the shell of the door 4, so that when the headlights 9, 10 are illuminated and the door 4 is open, current flows through the illuminating device 11 to ground through the switch 7. The power source for the headlights is the power supply to the vehicle 12. The power source to the illuminating device 11 is provided by a second double pole switch 13 which is fed with the power supply to the vehicle 14, which supplies the illumination device 11 through switch 8 on one pole, and which supplies the dome light 15, connected to ground 6 through the switch 7. The illumination device will illuminate in a solid fashion when the door 4 is in an open position, creating an electrical closed switch 7, when the headlights 9, 10 are on, and when the dome light 15 is not disabled.

A second door 16 controls a switch configured as switch 7, denoted as switch 17, enabling an illumination device 18 contained in door 16. One side of the switch 17 is tied to ground 6. A plurality of these networks and illumination devices can be configured in a vehicle, so that each door is equipped with its own illumination device enabled when the door is opened and the conditions described in the previous paragraph are met.

A double pole switch supplies power to the overhead emergency lights 20, 21 and to the mechanism 22 for rotating these lights. One side of this switch is tied to the electrical ground 6 of the vehicle. When in the on position, power 14 is supplied through a second pole to a device 23 which alternately provides power and blocks power, so as to create a series of pulses of illumination through an illumination device 24 located in the shell of the door 4. The circuit is only completed when the door 4 is open.

A similar network routes power through a second independent device which provides pulses of power 25 which flow through an illumination device located in the shell of a second door 16, and then to ground through switch 17. The blinking illumination occurs whenever the door is open and the emergency overhead lights are enabled.

Figure 1:
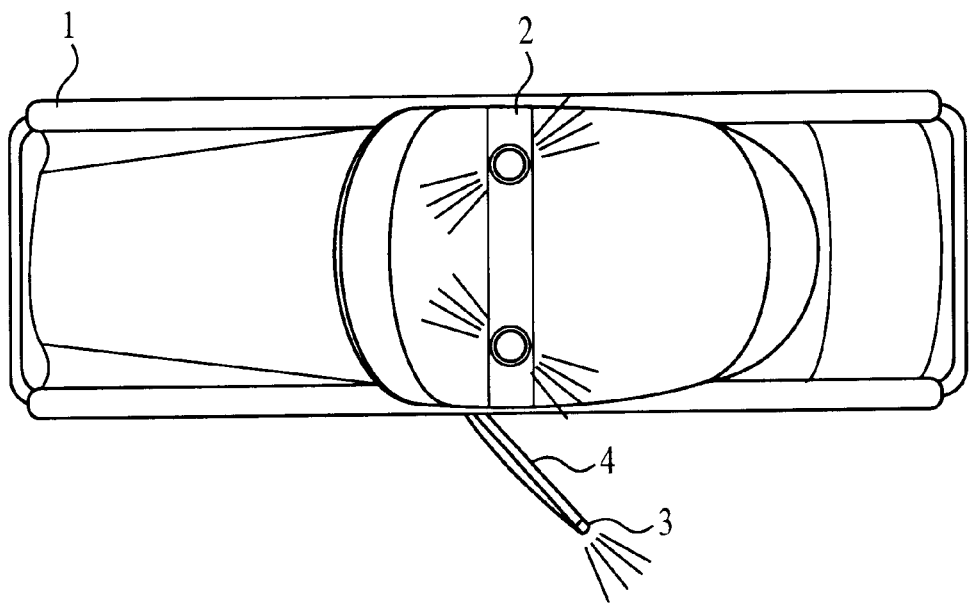
FIG. 1 shows the invention from a top view, with the emergency overhead lights enabled and the invention enabled with a pulsing warning indication.
Figure 2:
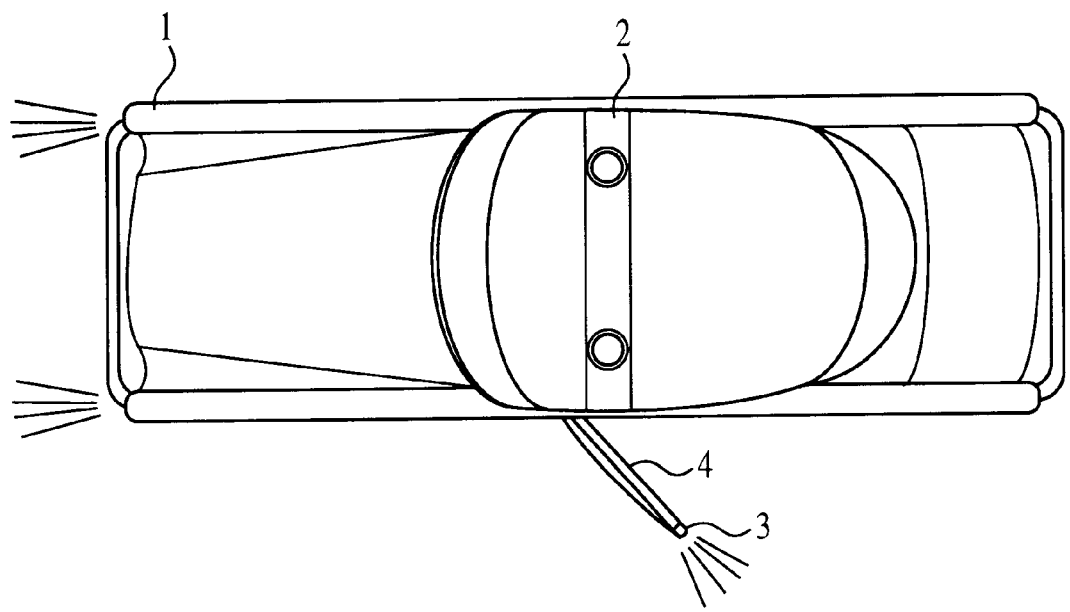
FIG. 2 shows the invention from a top view, with the headlights on, the emergency overhead lights disabled, and the invention enabled with a steady warning indication.
Figure 3:
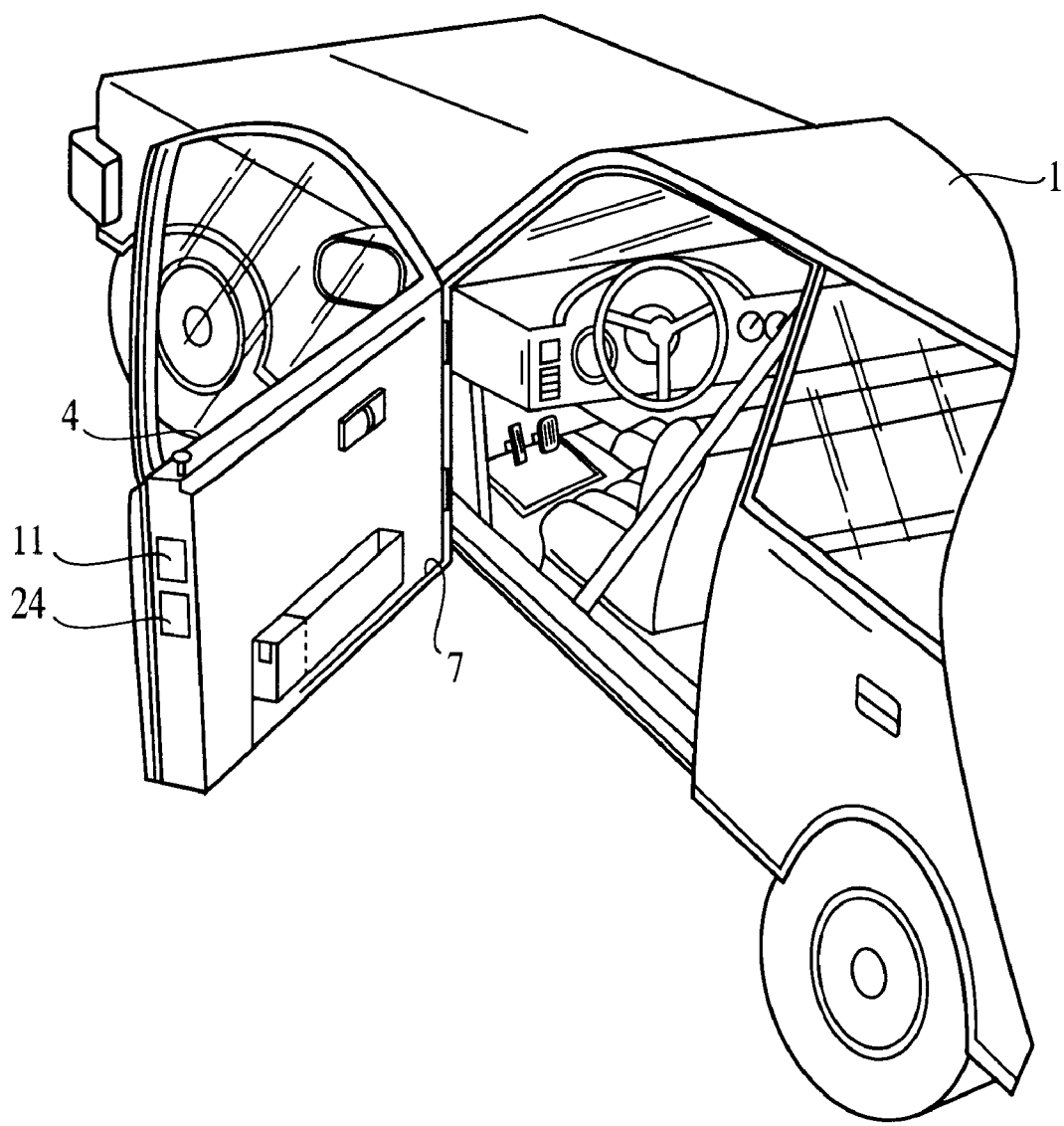
FIG. 3 shows a perspective of the illumination devices placed in the shell of the left front door of an emergency vehicle.
Figure 4:
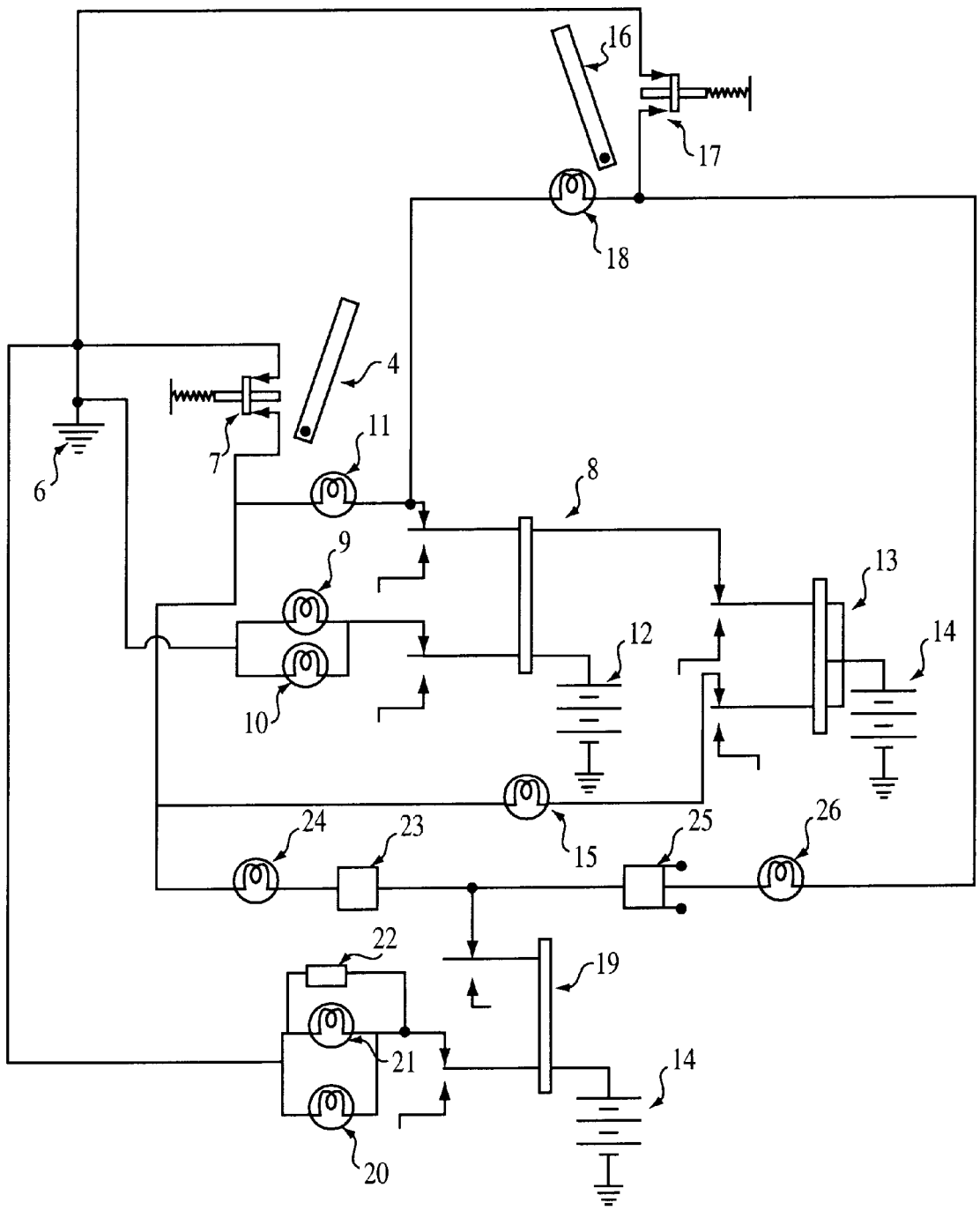
FIG. 4 shows the electrical circuit which enables the invention to selectively provide warning illumination when the door is opened, and which allows the warning illumination to be disabled when the overhead dome light is disabled.

I claim:

1. A hazard safety light system for a motor vehicle comprising:

a door in a motor vehicle which is attached to the motor vehicle by means of one or more hinges, said door having a connecting surface that connects an outer shell of said door to the surface exposed to the passenger of said vehicle when the door is in the closed position, being perpendicular to the ground and clearly visible when said door is in the open position;

an optical device to be mounted in said connecting surface of the door;

a door-switch that detects when the door has been opened;

an overhead emergency light facility, commonly installed on emergency vehicles to alert motorists that an emergency vehicle is traveling on an emergency basis, when utilized with an audible siren;

an emergency-switch that activates the overhead emergency lights;

a flashing-circuit which intermittently causes the optical device to be illuminated, thereby creating a flashing illumination;

a set of motor vehicle headlights suitable for illuminating the roadway ahead of a motor vehicle;

a headlight-switch that enables the headlights;

a dome light which illuminates the interior of the motor vehicle when any door in that motor vehicle is opened;

a dome-switch that selectively disables the dome light; and, a hazard-circuit which selectively causes the optical device to be energized so as to provide a hazard warning, whenever the door-switch detects that the door has been opened and the dome-switch has enabled the interior light, and with the headlight-switch being set to enable the motor vehicle's headlights.

2. A hazard safety light system for a motor vehicle as in claim 1, wherein the hazard-circuit is replaced by a circuit which selectively causes the optical device to be energized through the flashing-circuit so as to provide a flashing hazard warning, whenever the door-switch detects that the door has been opened and the dome-switch has enabled the interior light, and with the emergency-switch being set to enable the motor vehicle's overhead emergency light facility.

3. A hazard safety light system for a motor vehicle as in claim 1, wherein the hazard-circuit has all the functionality defined in claim 1 plus the ability to selectively cause the optical device to be energized through the flashing-circuit so as to provide a flashing hazard warning, whenever the door-switch detects that the door has been opened and the dome-switch has enabled the interior light, and with the emergency-switch being set to enable the motor vehicle's overhead emergency light facility.

* * * * *